United States Patent
Vummintala et al.

(10) Patent No.: US 7,450,662 B2
(45) Date of Patent: Nov. 11, 2008

(54) METHOD AND SYSTEM FOR MAXIMUM TRANSMIT DIVERSITY

(75) Inventors: Shashidhar Vummintala, Bangalore (IN); Arogyaswami Paulraj, Stanford, CA (US); Erik David Lindskog, Sunnyvale, CA (US); Balaji Sundar Rajan, Bangalore (IN); Djordje Tujkovic, Palo Alto, CA (US)

(73) Assignee: Beceem Communications Inc., Santa Clara, CA (US)

( * ) Notice: Subject to any disclaimer, the term of this patent is extended or adjusted under 35 U.S.C. 154(b) by 582 days.

(21) Appl. No.: 11/175,621

(22) Filed: Jul. 5, 2005

(65) Prior Publication Data

US 2006/0008031 A1 Jan. 12, 2006

Related U.S. Application Data

(60) Provisional application No. 60/586,940, filed on Jul. 9, 2004, provisional application No. 60/602,082, filed on Aug. 16, 2004, provisional application No. 60/606,358, filed on Aug. 31, 2004, provisional application No. 60/586,444, filed on Jul. 8, 2004.

(51) Int. Cl.
*H04L 27/00* (2006.01)
(52) U.S. Cl. ...................................... 375/299
(58) Field of Classification Search ............... 375/267, 375/299, 347, 349; 700/53; 455/101, 132–141
See application file for complete search history.

(56) References Cited

U.S. PATENT DOCUMENTS

2004/0196919 A1 * 10/2004 Mehta et al. ............... 375/267

* cited by examiner

*Primary Examiner*—Sam K Ahn

(57) ABSTRACT

The invention relates generally to the field of signal encoding in a multiple input multiple output system in a wireless communication network. This invention specifically relates to a method of encoding and transmitting symbols in a rate-1 complex symbol per second per Hertz transmission system while achieving maximum diversity. The invention discloses a method of interleaving the complex symbols such that each interleaved symbol comprises information of at least two complex symbols where the complex symbols obtain values from a rotated constellation.

23 Claims, 5 Drawing Sheets

METHOD AND SYSTEM FOR MAXIMUM TRANSMIT DIVERSITY

RELATED APPLICATION DATA

This application claims priority to and incorporates by reference U.S. provisional application No. 60/586,444, filed Jul. 8, 2004, and titled "Improved Space-Time Block Codes and Decoding methods"; U.S. provisional application No. 60/586940, filed Jul. 9, 2004, and titled "Space-time Block Codes and Decoding Methods"; U.S. provisional application No. 60/602082, filed Aug. 16, 2004, and titled "Communication System and Methods"; and, U.S. provisional application No. 60/606358, filed Aug. 31, 2004, and titled "Communication System and Methods."

FIELD OF THE INVENTION

The invention relates generally to the field of signal encoding in a multiple input multiple output system in a wireless communication network. This invention specifically relates to a method of encoding and transmitting symbols in a rate-1 complex symbol per second per Hertz transmission system while achieving maximum diversity.

BACKGROUND OF THE INVENTION

Reliability and speed of communications in a wireless network is increasingly crucial to serve growing user demands. This necessitates increasing improvements in technology.

Wireless communications systems can be deployed using a single transmit and a single receive antenna. The wireless channel distorts and adds other impairments to the received signal. These include additive noise, interference, time selective, frequency selective and space selective fading. Fading implies that the signal can be at different level at different antennas, or frequency or time. It is therefore important to transmit and or receive multiple replicas of the signal from multiple dimensions in space, frequency or time to increase the overall link reliability. This approach is known as diversity and is an important technique to assure reliable wireless communication over fading channels. Space diversity is obtained by using multiple antennas in the transmitter and/or in the receiver Typically digital modulation of transmitted data is used. Example of such modulation schemes include M-ary QAM, M-ary PSK etc. Multiple access schemes are also employed to support multiple users. Multiple access schemes include code division multiple access (CDMA), time division multiple access (TDMA), orthogonal frequency division modulation (OFDM) and orthogonal frequency division modulation access (OFDMA) are employed. Multiple antenna schemes can be used with any modulation and multiple access scheme. In an OFDM system, the operating frequency band is effectively partitioned into a number of "frequency sub channels", or frequency bins. Each sub channel is associated with one or more sub carriers upon which data is modulated.

The data to be transmitted (i.e., the information bits) are encoded with a chosen coding scheme to generate coded bits. With multiple transmit antennas, coding includes the space dimension along with time or frequency dimensions and are specific to the number of transmit and receive antennas. The encoding scheme determines the diversity that can be captured, the transmission rate and the decode complexity at the receiver. Though different encoding schemes are available in the art, new encoding scheme which enables simpler decoding at the receiver, have good diversity performance and capable of being used for different multiple transmitter-receiver antennas combinations are desired.

For example, U.S. Pat. No. 6,185,258 discloses, the Alamouti code, one such simple encoding arrangement scheme where symbols transmitted from two transmit antennas over a set of two time slots or frequency sub-channels, with coding that comprises only of simple arithmetic operations, such as negation and conjugation. Alamouti code achieves full transmit diversity. Full transmit diversity is achieved if the diversity contribution from the transmit antennas is equal to the number of transmit antennas. Alamouti code is a rate one scheme. i.e., it sends on average of one complex symbol per time slot or frequency bin. Use of Alamouti code across two frequency bins instead of time slots is also known in the art. The number of receive antennas is not specified in the Alamouti code. The code can be used for any number of receive antennas.

However, the Alamouti patent discloses a method of encoding and transmission using only two antennas. Using an Alamouti code over more than two transmit antennas cannot capture the diversity efficiently. Other prior art for more than two transmit antennas use the Alamouti code as a basic ingredient and constellation pre-coding. However, they fail to achieve maximum transmit diversity, and if they do, they are computationally expensive since they do not offer symbol by symbol decoding.

Hence there is a need for an encoding scheme which can be deployed in a wireless communications system with more than 2 transmit antennas and any number of receive antennas, which achieves both maximum transmit diversity with a rate-1 complex symbol per channel use and also offer low complexity symbol by symbol decoding.

BRIEF DESCRIPTION OF THE DRAWINGS

The accompanying drawings when read in conjunction with the description indicate the best way in which the present invention can be implemented. A preferred embodiment of the invention is now described, by way of only illustrating an exemplary mode only, and with reference to the accompanying figures in which.

DETAILED DESCRIPTION OF THE INVENTION

Figure 1:
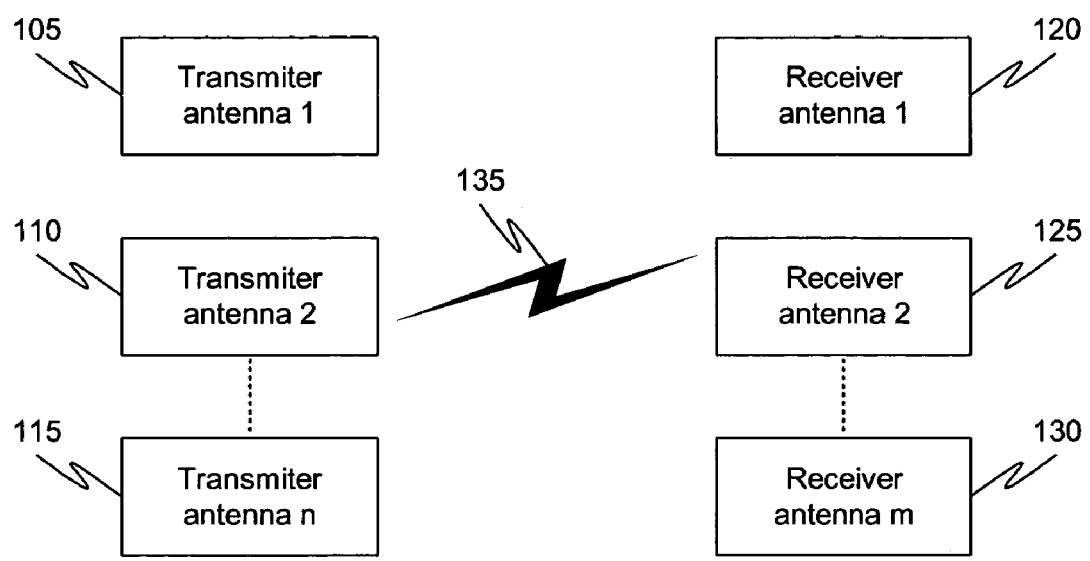
FIG. 1 illustrates a block diagram of a multiple input multiple output capable of deploying various aspects and embodiments of the invention.

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, common and well-understood elements that are useful or necessary in a commercially feasible embodiment may not be depicted in order to facilitate a less obstructed view of these various embodiments. Also, elements shown in the figures have not necessarily been drawn to scale. For example, the dimensions of some of the elements are exaggerated relative to each other. Further, where considered appropriate, reference numerals have been repeated among the figures to indicate corresponding elements. The present invention may be embodied in several forms and manners. Those of skill in the art will appreciate that the invention may be embodied in other forms and manners not shown below. The invention shall have the full scope of the claims and is not to be limited by the embodiments shown below.

Typically in wireless system signal may be transmitted from multiple transmit antennas and received at multiple receive antennas. Such a system is called a MIMO system. Use of MIMO system is motivated by various requirements such as transmit diversity in the link and rate of transmission. The present invention only depends on the transmit antennas and is independent of the number of receive antennas. The invention can therefore also be used in a single antenna receive system also known as MISO.

The present invention pertains to a signal transmission scheme. A signal undergoes encoding before transmission. Encoding generally dictates the decoding mechanism. Once the encoding process has been completed, the signal is transmitted using the transmit antennas. There are several transmission schemes known in the art. However, the invention proposes a method of encoding in a rate-1 complex symbol per channel use transmission system, where the encoded symbols can be transmitted over more than two transmit antennas in a manner that achieves full diversity. An advantage of the present invention is the decoding process at the receiver antennas. The decoding can be done symbol-by-symbol or linear decoding thereby substantially reducing the complexity of the decoding process. Symbol-by-symbol decoding is a method known in the art and is achieved in the present invention due to the method of encoding. Symbol-by-symbol decoding at the receiver end is a preferred form of decoding since it prevents signal entanglement and hence enables simple and fast decoding. The transmission of the encoded symbols yields maximum diversity.

Turning now to FIG. 1 shows a MIMO system in a wireless communications channel 135. Pursuant to an embodiment, of the invention, FIG. 1 illustrates n transmit antennas 105, 110, 115 and m receive antennas 120, 125, 130 being used to transmit signals over the transmission channel. The receive antennas may be on any wireless receiver residing on a base station and located on a radio tower, access point or hub or station, or on any wireless enabled client device such as a wireless computer, wireless laptop or a hand held device, such as a mobile phone or a personal digital assistant (PDA). The transmit antennas can be on any wireless transmitter residing on a base station and located on a radio tower, access point or hub or station, or on any wireless enabled client device such as a wireless computer, wireless laptop or a hand held device, such as a mobile phone or a personal digital assistant (PDA). The data to be transmitted needs to be mapped onto a signal for transmission from the transmit antennas that is interpreted on the receiver which is then decoded to retrieve the original data. The transmitted signal may include video, audio, voice or other forms of data.

In order to encode the signal efficiently, each signal is represented in the form of complex symbols. A complex symbol used in the encoding process, essentially comprises a real part and an imaginary part. The degree of redundancy in the encoding process is related to the diversity sought in transmission. This redundancy can be incorporated as space, time or frequency block codes.

Figure 2:
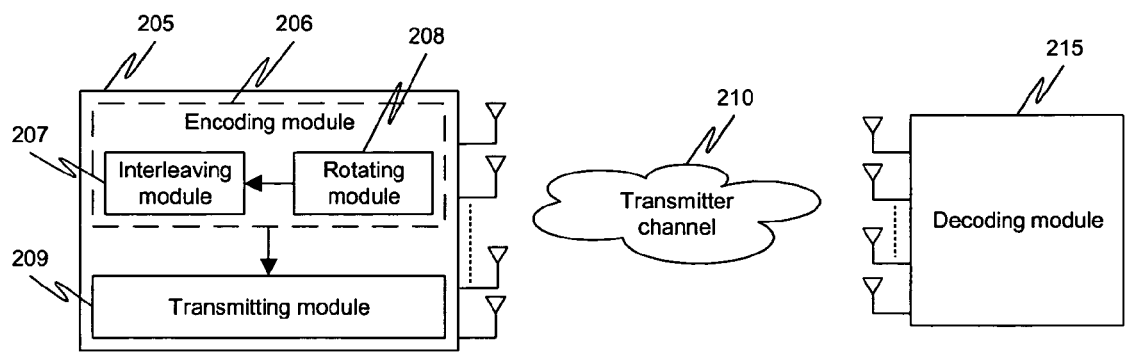
FIG. 2 illustrates a block diagram of an embodiment of the invention showing the system which deploys the various aspects of the invention.

FIG. 2 illustrates a communications system under an exemplary embodiment of the invention. A transmitter antenna system 205 receives a string of bits for transmission. The string of bits represent the data that needs to be transmitted and hence need to undergo an encoding process before transmission. The transmitter antenna system is coupled to a plurality of transmit antennas to enable a MIMO transmission. In one embodiment of the invention, the antenna system 205 comprises three transmit antennas and achieves a diversity of three due to the encoding and transmission techniques, explained below in greater detail. As shown in FIG. 2 the antenna system comprises an encoding module 206. The encoding module 206 further comprises a rotating module 208 and an interleaving module 207 in communication with each other. The encoding module is responsible for encoding the string of bits represented as complex symbols and sending the encoded bits to the transmitting module 209. Similarly, the receiver end comprises a decoding module 215 coupled to a plurality of receiver antennas receives the encoded bits. The encoded bits on being decoded retrieve the original data.

Pursuant to an exemplary embodiment of the invention, the transmitter antenna system 205 is coupled to three transmit antennas which use a rate-1 complex symbol per second per Hertz (four complex symbols) transmission scheme. The strings of bits are mapped onto a complex symbol constellation. The generation and mapping bits onto complex constellations such as a Quadrature Amplitude Modulation (QAM) constellation and Phase Shift Keying (PSK) constellation are known in the art. The transmitted complex symbols, four complex symbols in a rate-1 scheme, take values from the constellation. The string of bits represents the base band signal which is transmitted over the transmission channel using a carrier frequency. An embodiment of the invention, for transmitting the four complex symbols chosen from the constellation using four transmit antennas is explained later.

The encoding module 206 receives a set of four symbols (Rate-1) which obtain values from a set of symbols representing the constellation. A complex symbol is two-dimensional and can be placed on a number plane defined by a real number axis (horizontal) and an imaginary number axis (vertical). Hence a complex number has a real part and imaginary part written in the form a+jb, where 'a' represents the position along the real axis, while 'b' represents the position along the imaginary axis. The two-dimensional values relate to the magnitude and phase of an electromagnetic wave traveling through free space. As per an embodiment of the invention any two symbols in the constellation have different real parts and different imaginary parts. In other words, no two symbols in the constellation lie on the same vertical or horizontal line. In the case where the constellation is not represented in this manner, the constellation is rotated by an angle, example $0.5*\tan^{-1}(2)$, which results in a constellation with the above property. The constellation satisfying the above property is called a rotated constellation. Those skilled in the art shall appreciate that the constellation may not need to be rotated if the constellation satisfies the above property.

The set of four complex symbols to be transmitted, chosen from the constellation are represented as $x_1$, $x_2$, $x_3$ and $x_4$. The symbols are then interleaved. Interleaving is a process where the real part of a complex symbol $x_1$ is combined with an imaginary part of complex symbol $x_3$ and the real part of $x_3$ is combined with the imaginary part of $x_1$. For example, as per one embodiment, the interleaving can be as follows:

$\tilde{X}_1 = x_{1I} + jx_{3Q}$ $\tilde{X}_2 = x_{2I} + jx_{4Q}$ $\tilde{X}_3 = x_{3I} + jx_{1Q}$ $\tilde{X}_4 = x_{4I} + jx_{2Q}$ where $\tilde{X}1$, $\tilde{X}2$, $\tilde{X}3$, $\tilde{X}4$ are the set of four interleaved symbols corresponding to the set of four complex symbols, $x_i = x_{iI} + jx_{iQ}$, I=1, 2, 3, 4 ... and $j = \sqrt{-1}$. The interleaving module 207 combines the symbols in a manner where each interleaved symbol comprises information of two symbols from the set of the four symbols.

The encoding module sends the set of four interleaved symbols to a transmitting module 209 for transmitting the set of four interleaved symbols using the three transmit antennas. The interleaved symbols are arranged in a matrix format where each row of the matrix represents a transmitter antenna and the symbols are transmitted using the transmitter antenna. As stated previously, the set of four interleaved symbols are subjected to a process which creates a complex conjugate and a negative complex conjugate of each interleaved symbol to incorporate redundancy during transmission. Redundantly transmitting a selected few of the set of four interleaved symbols in different forms, such as a complex conjugate and a negative complex conjugate of the interleaved symbols provides additional support to the decoding module to retrieve the original data accurately incase where symbol information is lost in the transmission channel 210 due to the presence of noise or channel fading. As per the exemplary embodiment of the invention, two transmit antennas of the three transmit antennas transmits a predetermined combination of a first two interleaved symbols, a complex conjugate of the first two interleaved symbols and a negative complex conjugate of the first two interleaved symbols from the set of four interleaved symbols in a manner over a first transmission channel 210 and a predetermined combination of a second two interleaved symbols, a complex conjugate of the second two interleaved symbols and a negative complex conjugate of the second two interleaved symbols from the set of four interleaved symbols in a manner over a second transmission channel 210. The transmission ensures that each transmitter antenna of the three transmitter antennas transmits information (real part or imaginary part) about each symbol from the set of four symbols over two transmission channels 210. Some antennas transmit nothing or zero's instead of interleaved symbols such that the transmission matrix retains an orthogonal property. The arrangement of the interleaved symbols is such that two sets of Alamouti codes are interleaved with each other and transmitted over two transmission channels using three or four antennas. The Alamouti encoding scheme to create Alamouti codes and the arrangement of the Alamouti codes is known in the art. The arrangement pursuant to the embodiment disclosed above, depicting antennas that transmit interleaved symbols and antennas that transmit zeros over a specific transmission channels is explained in greater detail in FIG. 3

A transmission channel in 210 is generally a frequency that the symbols are transmitted over based on a carrier frequency. Since the interleaving module 207 ensures that each interleaved symbol comprises information of two complex symbols, the transmitter antenna while transmitting each interleaved symbol is in essence transmitting information of two complex symbols. The interleaving process also enhances diversity. Additionally, since each complex symbol has already been rotated and has a different real and imaginary part i.e. a real part of one symbol is not the same as a real part of another symbol or the imaginary part of one symbol is not the same as the imaginary part of another symbol, the decoding module can retrieve the original symbol by de-interleaving the interleaved symbols during the decoding process. Those skilled in the art shall appreciate that the interleaved symbols can be transmitted based on various permutations as long as each transmitter antenna transmits information of each symbol form the set of four symbols in a rate-1 transmission scheme.

Similarly, in the case of a four antenna transmit system the transmission ensures that each transmitter antenna of the four transmitter antennas transmits information (real part or imaginary part) about each symbol from the set of four symbols over two transmission channels in 210.

Figure 3:
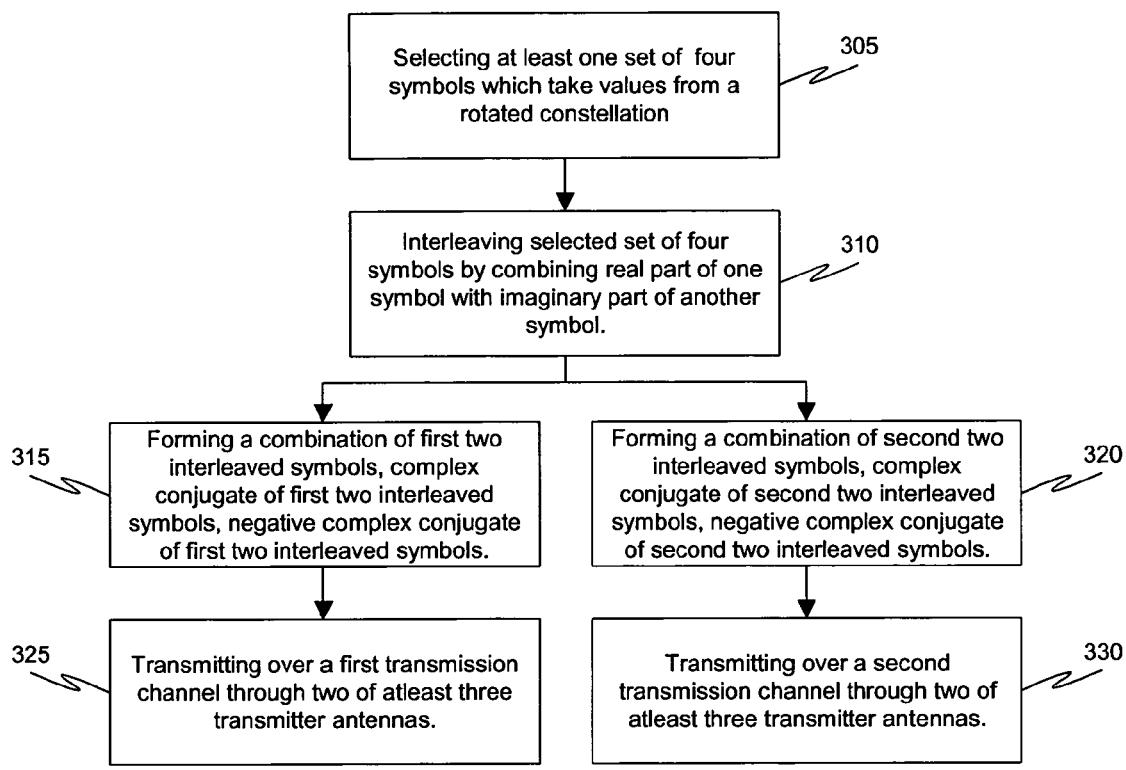
FIG. 3 depicts a flow diagram of the steps performed in the process of encoding the input signal set.

Turning now to FIG. 3, shows a flow diagram of the steps performed in the process of encoding and thereafter transmitting the set of four symbols. Initially, a string of bits are mapped onto the constellation. The set of four symbols obtain values from the constellation. Based on the requirement, the symbol can obtain the same value for all four symbols from the set of four symbols or different values for each symbol or a combination. Each symbol in the constellation has a different representation compared to the other symbol, step 305. If the representation of the symbols is the same, which means, that the real and imaginary part of at least one symbol is the same as the real and imaginary part of another symbol, the symbol is rotated such that it does not have the same representation as the other symbol. A preferred angle for rotation is $0.5 * \tan^{-1} 2$.

Assume the set of four symbols being represented as $x_1, x_2, x_3, x_4$. Those skilled in the art shall appreciate that $x_1, x_2, x_3, x_4$ can be the same symbol i.e. having the same values, or different symbols i.e. having different values. In an embodiment, $x_1, x_2, x_3, x_4$ are different symbols having different values chosen from a rotated constellation. The set of four symbols are then interleaved, step 310. The interleaving of the symbols ensures that each interleaved symbol comprises information of two symbols from the set of four symbols. This helps to provide maximum diversity during transmission. As per one embodiment, the interleaving process combines the real part of one symbol with the imaginary part of another symbol. The result is that each interleaved signal bears a real part of one signal and an imaginary part of another signal. For the set of symbols $x_1, x_2, x_3, x_4$, the interleaving process can be done in several ways. For example, $\tilde{X}_1 = x_{1I} + jx_{3Q}$ $\tilde{X}_2 = x_{2I} + jx_{4Q}$ $\tilde{X}_3 = x_{3I} + jx_{1Q}$ $\tilde{X}_4 = x_{4I} + jx_{2Q}$ where $\tilde{X}_1, \tilde{X}_2, \tilde{X}_3, \tilde{X}_4$ are the set of four interleaved symbols corresponding to the set of four complex symbols, $x_1 = x_{iI} + jx_{iQ}$, I=1, 2, 3, 4 ... and $j = \sqrt{-1}$. Those skilled in the art shall appreciate that $\tilde{X}_1, \tilde{X}_2, \tilde{X}_3, \tilde{X}_4$ can be interleaved in several different ways and all such ways are within the scope of the present invention. For example, $\tilde{X}_1 = x_{1I} + jx_{4Q}$ $\tilde{X}_2 = x_{2I} + jx_{3Q}$ $\tilde{X}_3 = x_{3I} + jx_{2Q}$ $\tilde{X}_4 = x_{4I} + jx_{1Q}$ Additionally to incorporate redundancy during transmission to account for the loss due to transmission channel fading, noise, interference or any other form of loss of signal, each interleaved symbol is replicated in the form of a complex conjugate and a negative complex conjugate. Performing a complex conjugate and a negative complex conjugate changes the sign of a certain term in the complex symbol and can be used to get additional information of the complex symbol in the event of a loss of signal in the transmission channel. For example, if the interleaved symbol $\tilde{X}_2$ which comprises information of complex symbols $x_2$ and $x_4$ suffers interference, the complex conjugate of $\tilde{X}_2$ represented as $\tilde{X}_2^*$ can aid in retrieving information of the original channel symbol.

Once the complex symbols have been interleaved, in one embodiment, they are arranged in a matrix where each row of the matrix corresponds to a transmitter antenna. Pursuant to one embodiment, the matrix can be represented as follows for a three transmit antenna system. Those skilled in the art shall appreciate that the matrix is merely meant to depict a representation for transmission of the interleaved symbols and any structure that enables transmission in the manner described below can be used and all such structures are within the scope of the present inventions.

| $\tilde{X}_1$ | $-(\tilde{X}_2)^*$ | 0 | 0 |
|---|---|---|---|
| $\tilde{X}_2$ | $(\tilde{X}_1)^*$ | $\tilde{X}_3$ | $-(\tilde{X}_4)^*$ |
| 0 | 0 | $\tilde{X}_4$ | $(\tilde{X}_3)^*$ |

Each row of the matrix represents a transmitter antenna and the first two columns represent a first transmission channel (a specified frequency for transmission) and the last two columns represent a second transmission channel. The interleaved symbols in the first column and the third column are transmitted at the first time and the interleaved symbols in the second column and the fourth column are transmitted at the second time. However, the interleaved symbols from the first two columns are transmitted over a first transmission channel and the interleaved symbols from the last two columns are transmitted over a second transmission channel. The encoding incorporates a time, space and frequency division multiplexing simultaneously.

Subsequent to the interleaving operation, a combination of a first two interleaved symbols, a complex conjugate of the first two interleaved symbols and a negative complex conjugate of the first two interleaved symbols from the set of four interleaved symbols are created and transmitted using two transmit antennas from the three transmit antennas over a first transmission channel and a combination of a second two interleaved symbols, a complex conjugate of the second two interleaved symbols and a negative complex conjugate of the second two interleaved symbols from the set of four interleaved symbols is transmitted using the two transmit antennas from the three transmit antennas over a second transmission channel, step 315, 320, 325, 330.

For example, in the embodiment of the matrix provided above, the first antenna transmits interleaved symbol $\tilde{X}_1$ and a negative complex conjugate of $\tilde{X}_2$ represented as $-(\tilde{X}_2)^*$ on the first transmission channel and zeros on the second transmission channel. Hence, $\tilde{X}_1$ comprises information of complex symbol $x_1$ and complex symbol $X_3$ while $-(\tilde{X}_2)^*$ comprises information of complex symbol $x_2$ and complex symbol $x_4$. The transmission of zeros under the transmission channels disclosed enables symbol-by-symbol decoding, thereby substantially reducing the complexity. The second transmit antenna transmits interleaved symbol $\tilde{X}_2$ and complex conjugate of interleaved symbol $\tilde{X}_1$ on the first transmission channel and interleaved symbol $\tilde{X}_3$ and a negative complex conjugate of $\tilde{X}_4$ represented as $-(\tilde{X}_4)^*$ on the second transmission channel. The arrangement of the interleaved symbols for transmission is such that the interleaved symbols of the first row and the interleaved symbols of the second row, being transmitted over the first transmission channel retain an orthogonal property which enables a faster decoding at the receiver end. Similar to the first transmit antenna, the set of four interleaved symbols transmitted using the second transmit antenna also comprise information of each complex symbol and in addition incorporate redundancy with the transmission of complex conjugates and negative complex conjugates of the interleaved symbols. The third transmit antenna transmits zeros over the first transmission channel and interleaved symbol $\tilde{X}_4$ and a complex conjugate of $\tilde{X}_3$ represented as $(\tilde{X}_3)^*$ over the second transmission channel. Again, the zeros transmitted on the first transmission channel enable symbol-by-symbol decoding. The arrangement of the interleaved symbols in the matrix is such that the matrix comprises two Alamouti codes that are interleaved with each other. The Alamouti encoding scheme to create Alamouti codes and the arrangement of the Alamouti code is known in the art.

During the decoding process, at each receiver antenna we have the received complex symbol $Y_i(j)$ at the $i^{th}$ time and $j^{th}$ subcarrier or transmission channel as:

$$Y(1) = [Y_1(1) \ Y_2(1)] =$$

$$[h_1(1) \ h_2(1) \ h_3(1)] \begin{bmatrix} \tilde{X}_1 & -\tilde{(X_2)}* \\ \tilde{X}_2 & \tilde{(X_1)}* \\ 0 & 0 \end{bmatrix} + [n_1(1) \ n_2(1)]$$

$$Y(2) = [Y_1(2) \ Y_2(2)] =$$

$$[h_1(2) \ h_2(2) \ h_3(2)] \begin{bmatrix} 0_1 & 0 \\ \tilde{X}_3 & -\tilde{(X_4)}* \\ \tilde{(X_4)} & \tilde{(X_3)}* \end{bmatrix} + [n_1(2) \ n_2(2)]$$

$n_i(j)$ represents the noise in the transmission channel $$\begin{bmatrix} Y_1(1) \\ Y_2(1)* \\ Y_1(2) \\ Y_2(2)* \end{bmatrix} = \underbrace{\begin{bmatrix} h_1(1) & h_2(1) & 0 & 0 \\ h_2(1)* & -h_1(1)* & 0 & 0 \\ 0 & 0 & h_2(2) & h_3(2) \\ 0 & 0 & h_3(2)* & -h_2(2)* \end{bmatrix}}_{H} \begin{bmatrix} \tilde{X}1 \\ \tilde{X}2 \\ \tilde{X}3 \\ \tilde{X}4 \end{bmatrix} + \begin{bmatrix} n_1(1) \\ n_2(1)* \\ n_1(2) \\ n_2(2)* \end{bmatrix}$$

The matrix H represents the equivalent channel matrix which is an orthogonal matrix. We have, after multiplying both sides of the above equation with complex conjugate transpose of H, $Y'_1 = (|h_1(1)|^2 + |h_2(1)|^2) \tilde{X}_1 + n'_1$ $Y'_2 = (|h_1(1)|^2 + |h_2(1)|^2) \tilde{X}_2 + n'_2$ $Y'_3 = (|h_2(2)|^2 + |h_3(2)|^2) \tilde{X}_3 + n'_3$ $Y'_4 = (|h_2(2)|^2 + |h_3(2)|^2) \tilde{X}_4 + n'_4$ De-interleaving the real and imaginary parts of $Y'_i s$ we have:

$$Y''_1 = x_1 + n''_1$$

$$Y''_2 = x_2 + n''_2$$

$$Y'''_3 = x_3 + n''_3$$

$$Y'''_4 = x_4 + n''_4$$

Hence, it is clear from the embodiment described above that the complex symbols can be decoded symbol-by-symbol and the diversity gain is equal to four for three transmit antennas and four for four transmit antennas if the transmission channels are statistically independent.

Similarly, in the case of four transmit antennas, the arrangement of the

| ⁻X1 | ⁻−(X2)* | 0 | 0 |
| ⁻X2 | ⁻(X1)* | 0 | 0 |
| 0 | 0 | ⁻X3 | ⁻−(X4)* |
| 0 | 0 | ⁻X4 | ⁻(X3)* | matrix will be as follows, where each row of the matrix represents a transmit antenna.

Each transmit antenna transmits information of all symbols over two transmission channels. The method of encoding and transmission described above is similar to the one described for three transmit antennas. However, the diversity of a four transmit antenna system using the encoding method described above is maximum i.e. four. Those skilled in the art shall appreciate that as stated previously, the set of four interleaved symbols can be replaced by other interleaved symbols in any manner such that each transmitter antenna transmits information of all four symbols while incorporating redundancy. The transmission of zeros under the transmission channels disclosed enables symbol-by-symbol decoding.

Figure 4:
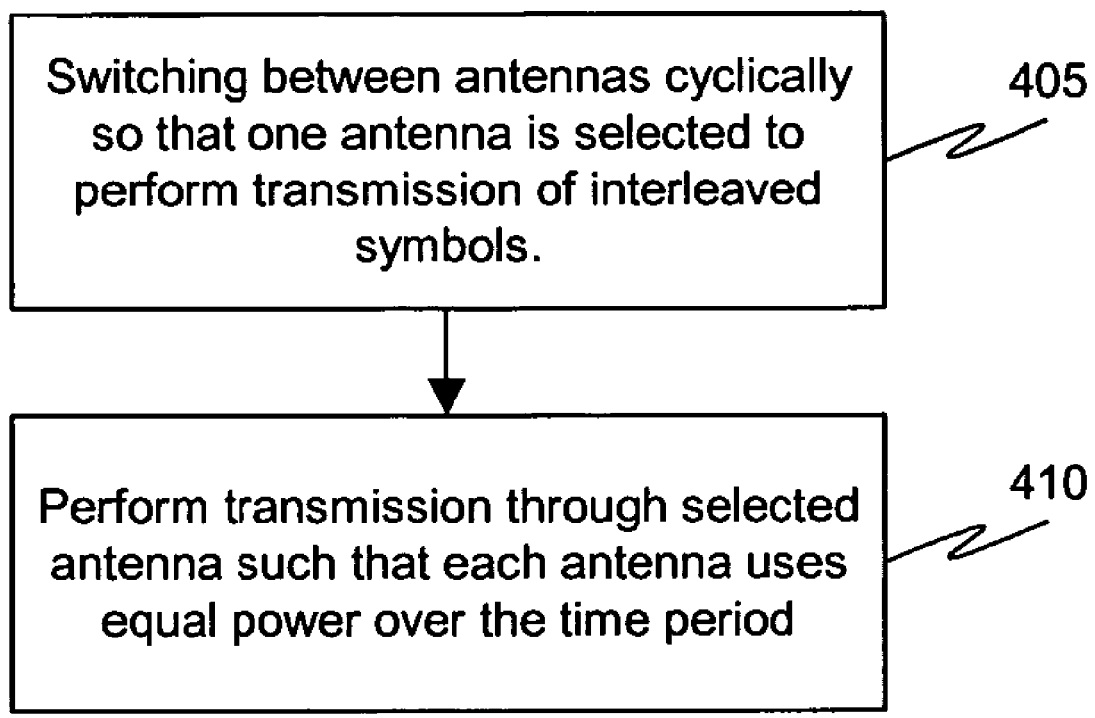
FIG. 4 illustrates a flow diagram of the steps performed in the process of uniform antenna loading.

Turning now to FIG. 4, illustrates a flow diagram depicting an equal sharing of power due to the transmission technique disclosed above pursuant to an embodiment of the present invention. During the transmission of interleaved symbols, the antennas are switched, step 405 such that each antenna consumes equal power over the time period, step 410. In one embodiment, the switching can be cyclical. For example, in the case of the three transmit antenna matrix disclosed above, the second antenna transmits four interleaved symbols while the first and third transmit antennas transmit only two interleaved symbols over two transmission channels.

| ⁻X2 | ⁻(X1)* | ⁻X3 | ⁻−(X4)* |
| ⁻X1 | ⁻−(X2)* | 0 | 0 |
| 0 | 0 | ⁻X4 | ⁻(X3)* |

Hence, in another embodiment, the antennas can be switched where next time the first transmit antenna transmits four interleaved symbols and the other two transmit antennas can transmit two interleaved symbols as shown above. Switching between the antennas enables the power and load of each antenna to be distributed uniformly over time.

Figure 5A:
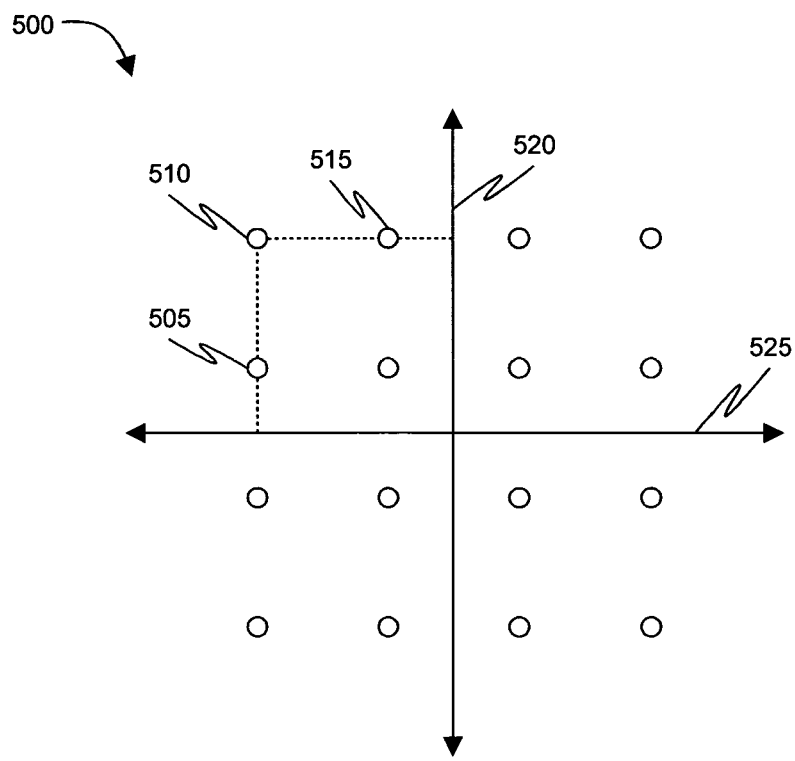
FIG. 5(a) and FIG. 5(b) illustrate a regular and rotated constellation respectively.
Figure 5B:
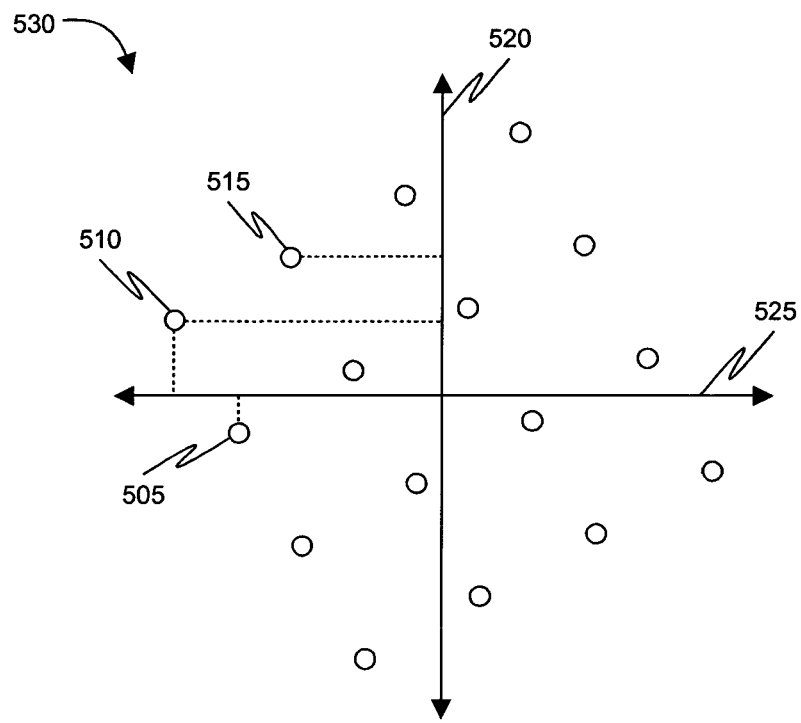

Turning now to FIG. 5(a) depicting a regular QAM constellation 500 pursuant to an embodiment of the present invention. Some symbols from the set of symbols being represented by signal points have the same real or imaginary part as another symbol from the set of symbols. The horizontal axis 525 represents the real axis and the vertical axis 520 represents the imaginary axis. For example, complex symbol 505 has the same real part as complex symbol 510 and complex symbol 510 has the same imaginary part as complex symbol 515. Hence, FIG. 5(b) shows a rotated constellation 530 where the previous constellation 500 is rotated by a predetermined angle, for example $0.5*\tan^{-1}(2)$, to obtain the rotated constellation 530. The rotated constellation 530 comprises points such that no two symbols from the set of symbols have the same real or imaginary part as another symbol. For example, complex symbol 505, after rotation has a different real part than the complex symbol 510 and a different real part than all complex symbols of the constellation and complex symbol 510, after rotation has a different imaginary part than complex symbol 515 and different imaginary part than all complex symbols of the constellation. It is obvious to those skilled in the art that the real part of one complex symbol can be the same as the imaginary part of another complex symbol.

The present invention addresses an encoding and transmission method using three or four antennas. To retain maximum diversity and enable symbol-by-symbol decoding, any transmit antenna in addition to four would need to transmit zeros over both transmission channels.

What is claimed is:

1. A method for transmitting at least one set of four symbols via at least three transmit antennas, the method comprising:

selecting the set of the four symbols from a set of symbols wherein each symbol from the set of symbols takes values from a rotated constellation;

encoding a set of four interleaved symbols corresponding to the set of four symbols, each interleaved symbol from the set of four interleaved symbols being created by combining a first part of one symbol with a second part of one other symbol, the symbol and the one other symbol forming part of the set of four symbols; and transmitting the set of four interleaved symbols using the at least three transmit antennas wherein two transmit antennas of the at least three transmit antennas transmit a combination of a first two interleaved symbols, a complex conjugate of the first two interleaved symbols and a negative complex conjugate of the first two interleaved symbols from the set of four interleaved symbols in a predetermined manner over a first transmission channel and a combination of a second two interleaved symbols, a complex conjugate of the second two interleaved symbols and a negative complex conjugate of the second two interleaved symbols from the set of four interleaved symbols in a predetermined manner over a second transmission channel such that each transmitter antenna of the at least three transmitter antenna transmitting an information about each symbol from the set of four symbols over two transmission channels, wherein the rotated constellation is obtained by rotating the constellation if a real or an imaginary part of one symbol of the constellation has a same real or an imaginary part as another symbol of the constellation.

2. The method of claim 1, wherein a rotating angle of the rotated constellation is $0.5*\tan^{-1}(2)$.

3. The method of claim 1, wherein transmitting step further comprises incorporating redundancy in the set of four interleaved symbols using a conjugate of an interleaved symbol or forming a negative complex conjugate of an interleaved symbol for each interleaved symbol from the set of four interleaved symbols.

4. The method of claim 1, wherein the transmitting step further comprises: switching between the transmitter antennas in a cyclic manner to transmit the set of four interleaved symbols such that each transmit antenna transmits a substantially equal number of interleaved symbols over a time period, each transmitter antenna using a substantially equal amount of power over the time period.

5. The method of claim 1, wherein the plurality of interleaved symbols can be decoded at a receiver end using a symbol-by-symbol decoding.

6. An arrangement for transmitting a set of four symbols using at least three transmit antennas, the arrangement comprising:
   an encoder to receive a set of four interleaved symbols corresponding to the set of four symbols, each interleaved symbol from the set of four interleaved symbols being created by combining a first part of one symbol with a second part of one other symbol, the symbol and the one other symbol forming part of the set of four symbols, and a replication of a conjugate of each interleaved symbol and a negative complex conjugate of each interleaved symbol; and
   an arranging means for arranging the set of four interleaved symbols in a matrix, the matrix having at least three rows and four columns, each row of the matrix corresponding to a transmitter antenna, wherein the matrix comprises:
   a first row with a first two interleaved symbols from the set of four interleaved symbols in a first two columns of the matrix and zeros in a last two columns of the matrix,
   a second row with a complex conjugate and a negative complex conjugate of the first two interleaved symbols from the set of four interleaved symbols in the first two columns of the matrix and second two interleaved symbols from the set of four interleaved symbols in the last two columns of the matrix,
   a third row with zero in the first two columns of the matrix and a complex conjugate and a negative complex conjugate of the second two interleaved symbols in the second two columns of the matrix, the first two columns representing the first transmission channel and the last two columns representing the second transmission channel.

7. The arrangement of claim 6, wherein the set of four symbols take values from a rotated constellation.

8. The arrangement of claim 7, wherein the set of four interleaved symbols can be decoded at a receiver end using a symbol-by-symbol decoding technique.

9. The arrangement of claim 7, wherein the first part is a real part of the symbol and the second part is an imaginary part of the other symbol.

10. The arrangement of claim 6, further comprises rotating the constellation, if a real and an imaginary part of one symbol from a constellation is the same as a real and imaginary part of another symbol in the constellation respectively.

11. The arrangement of claim 6, wherein the matrix further comprises:
   a fourth row representing a fourth transmitter antenna being used in a predetermined manner to transmit the set of four interleaved symbols.

12. A system for transmitting at least one set of four symbols, the system comprising:
   an encoding module to receive the at least one set of four symbols from a set of symbols, wherein each symbol from the set of symbols is represented in a different manner from each other symbol from the set of symbols, the encoding module further comprising:
   an interleaving module to interleave each symbol from the set of four symbols with a corresponding combining symbol to obtain a set of four interleaved symbols corresponding to the set of four symbols, each interleaved symbol from the set of four interleaved symbols comprises an information of the symbol and the corresponding combining symbol, the symbol and the corresponding combining symbol forming a part of the set of four symbols;
   transmitting the set of four interleaved symbols using the at least three transmit antennas wherein at least two transmit antennas of the three transmit antennas transmit a combination of a first two interleaved symbols, a complex conjugate of the first two interleaved symbols and a negative complex conjugate of the first two interleaved symbols from the set of four interleaved symbols in a predetermined manner over a first transmission channel and a combination of a second two interleaved symbols, a complex conjugate of the second two interleaved symbols and a negative complex conjugate of the second two interleaved symbols from the set of four interleaved symbols in a predetermined manner over a second transmission channel such that each transmitter antenna of the at least three transmitter antenna transmitting an information about each symbol from the set of four symbols over two transmission channels;
   a rotating module to rotate a constellation by a predetermined angle, if a real or imaginary part of one symbol from the constellation is equal to a real or imaginary part of another symbol form the constellation.

13. The system of claim 12, wherein the encoding module and the transmitting module are integrated within a single module.

14. The system of claim 13, wherein the single module can be implemented as part of a base station or a subscriber station.

15. The system of claim 13, wherein the single module can be implemented on a microprocessor.

16. The system of claim 12, wherein the encoding module and the transmitting module can be configured to transmit the set of four interleaved symbols using an additional transmitter antenna in a predetermined manner.

17. The system of claim 12, wherein the at least one set of four symbols are transmitted over a wireless medium.

18. The system of claim 12, wherein the set of four interleaved symbols can be transmitted by switching between the transmitter antennas in a cyclic manner such that each transmit antenna transmits a substantially equal number of interleaved symbols over a time period, each transmitter antenna using a substantially equal amount of power over the time period.

19. A method for transmitting at least one set of four symbols via at least three transmit antennas, the method comprising:
   selecting the one set of the four symbols from a set of symbols wherein each symbol from the set of symbols takes values from a rotated constellation;
   creating a set of four interleaved symbols corresponding to the set of four symbols by combining a first part of one symbol of the set of four symbols with a second part of one other symbol of the set of four symbols; and
   transmitting the set of four interleaved symbols using the at least three transmit antennas wherein two transmit antennas of the at least three transmit antennas transmit a combination of a first two interleaved symbols, a complex conjugate of the first two interleaved symbols and a negative complex conjugate of the first two interleaved symbols from the set of four interleaved symbols over a first transmission channel and a combination of a second two interleaved symbols, a complex conjugate of the second two interleaved symbols and a negative complex conjugate of the second two interleaved symbols from the set of four interleaved symbols over a second transmission channel such that each transmitter antenna of the at least three transmitter antenna transmitting an information about each symbol from the set of four symbols over two transmission channels, wherein the rotated constellation is obtained by rotating the constellation if a real or an imaginary part of one symbol of the constellation has a same real or an imaginary part as another symbol of the constellation.

20. An arrangement for transmitting a set of four symbols using at least three transmit antennas, the arrangement comprising:

an encoder to receive a set of four interleaved symbols corresponding to the set of four symbols, each interleaved symbol from the set of four interleaved symbols being created by combining a first part of one symbol with a second part of one other symbol, the symbol and the one other symbol forming part of the set of four symbols, and a replication of a conjugate of each interleaved symbol and a negative complex conjugate of each interleaved symbol; and an arranging means for arranging the set of four interleaved symbols in a matrix, the matrix having at least three rows and four columns, each row of the matrix corresponding to a transmitter antenna, wherein the matrix comprises:

a first row with a first two interleaved symbols from the set of four interleaved symbols in a first two columns of the matrix and zeros in a last two columns of the matrix, a second row with a complex conjugate and a negative complex conjugate of the first two interleaved symbols from the set of four interleaved symbols in the first two columns of the matrix;

a third row with zero in the first two columns of the matrix and a complex conjugate and a negative complex conjugate of the second two interleaved symbols in the second two columns of the matrix, the first two columns representing the first transmission channel and the last two columns representing the second transmission channel.

21. The arrangement of claim 20, wherein the matrix further comprises:

a fourth row representing a fourth transmitter antenna being used in a predetermined manner to transmit the set of four interleaved symbols.

22. The arrangement of claim 20, wherein the matrix further comprises:

a first row representing a second transmitter antenna being used in a predetermined manner to transmit the set of four interleaved symbols.

23. The arrangement of claim 20, wherein the matrix in the arranging step further comprises:

a second row representing a second transmitter antenna being used in a predetermined manner to transmit the set of four interleaved symbols.

* * * * *